United States Patent
Yung et al.

(12)

(10) Patent No.: US 7,756,827 B1
(45) Date of Patent: Jul. 13, 2010

(54) RULE-BASED, EVENT-DRIVEN, SCALABLE DATA COLLECTION

(75) Inventors: Alex Yung, Walnut, CA (US); Greg Korenevsky, Manhattan Beach, CA (US); Thomas Burlew, Woodland Hiils, CA (US)

(73) Assignee: Teradata US, Inc., Miamisburg, OH (US)

( * ) Notice: Subject to any disclaimer, the term of this patent is extended or adjusted under 35 U.S.C. 154(b) by 933 days.

(21) Appl. No.: 10/186,087

(22) Filed: Jun. 28, 2002

(51) Int. Cl.
*G06F 7/00* (2006.01)
(52) U.S. Cl. .................. 707/634; 707/609; 707/610
(58) Field of Classification Search ............ 707/1–206, 707/999.001, 999.002, 999.003, 999.004, 707/999.01, 999.2
See application file for complete search history.

(56) References Cited

U.S. PATENT DOCUMENTS

| | | | | |
|---|---|---|---|---|
| 5,504,899 | A  * | 4/1996 | Raz | 707/10 |
| 7,013,284 | B2 * | 3/2006 | Guyan et al. | 705/9 |
| 2002/0156785 | A1 * | 10/2002 | Kumar et al. | 707/10 |
| 2003/0018643 | A1 * | 1/2003 | Mi et al. | 707/10 |

* cited by examiner

*Primary Examiner*—Hung Q Pham
(74) *Attorney, Agent, or Firm*—Howard Speight

(57) ABSTRACT

A method, computer program and computer system for collecting data from one or more data sources, into which data is continuously stored, and for loading the collected data into one or more data targets is disclosed. One or more events are defined and one or more rules are associated with each event. When one of the one or more events occurs, unmarked data is collected from the one or more data sources in accordance with the rules associated with the one event, the collected, unmarked data in the one or more data sources is marked, and the collected data is stored in one or more of the data targets.

37 Claims, 8 Drawing Sheets

RULE-BASED, EVENT-DRIVEN, SCALABLE DATA COLLECTION

BACKGROUND

In a traditional data warehousing environment, most of the data access applications are engineered to process a large volume of detailed data within a predefined "batch window," during which applications take the maximum system resources for exporting, updating, and loading data warehouses. Completion of the data load marks the beginning of a "query cycle" where data is available for analytical work. Typically, data loads do not occur during the query cycle.

The focus of data warehouses is to provide complex, strategic decision support within an organization. While batch processing of detailed data is instrumental for data warehousing, such processing is usually confined by predefined scheduling criteria that are largely independent of individual, transactional events that can occur any time in a day. In today's competitive business environment where tactical decisions need to be made in a timely and factual manner, there is a strong growing need for an "active data warehouse" that provides high-performance data access, high data freshness, and 24×7×52 availability. In addition, user's intelligence about the logistics, sizes, and structure of data sources is also an integral part of this type of data warehouses.

In a traditional data warehousing environment, most of the data access components focus on fast loading and unloading of data with a high degree of parallelism and scalability. With the strong growing need of the "active" data warehouse where data is continuously loaded, updated, and queried, the burden on the data access components increases. In such an active environment, the data access components are required to be more intelligent in terms of what data is to be optimally accessed (or processed) at what time. This is due to the fact that there is a much higher demand for real-time tactical decision queries in the active data warehousing environment than for strategic decision queries in the traditional data warehouse environment. As a consequence, continuous availability and data freshness become almost absolute requirements, which demand a different approach to accessing data.

One of the major differences between an active data warehouse and a traditional data warehouse is that the former lacks the clearly identified load and query cycles, which means the data can be continuously loaded and continuously queried. Analytical applications, too, may be running continuously. Source data may appear at unpredictable times. Clearly, such a scenario presents some difficult issues to the data access components. Another difficult issue with data access is the emergence of concurrent access for short, tactical decision queries. One common way to maintain throughput for tactical queries is to place restraints on longer, analytical queries. However, those restraints by themselves might also demand another data access approach.

SUMMARY

To address these issues in the active data warehousing environment, a generic, parallel, event-driven, rule-based scalable data collecting method is introduced. The method incorporates scalability, data semantics, and users' intelligence into the data access components so that the components can intelligently access data at the right time, at the right place, with high performance and optimal use of system resources.

In general, in one aspect, the invention features a method for collecting data from one or more data sources, into which data is continuously stored, and loading the collected data into one or more data targets. The method includes defining one or more events and defining one or more rules associated with each event. When one of the one or more events occurs, the method includes causing unmarked data to be collected from the one or more data sources in accordance with the rules associated with the one event, marking the collected, unmarked data in the one or more data sources, and causing the collected data to be stored in one or more of the data targets.

Implementations of the invention may include one or more of the following. Defining one or more events may include predefining as events specific changes in the state of a given data source. Defining one or more rules may include identifying one or more ranges of one or more parameters associated with the events generated for one or more data sources, such that if the one or more parameters associated with the data in the one or more data sources fall within the one or more ranges, a condition of a rule is satisfied. Defining one or more rules may include predefining specific courses of action to follow when the condition of the rule is satisfied.

Identifying parameters may include identifying information at one or more of the following levels: the application level, the program level, and the performance level. Causing unmarked data to be collected may include identifying, according to the rules associated with the one event, the data to be collected and collecting the unmarked data from the identified data to be collected. Marking the collected, unmarked data may include setting a flag associated with the collected, unmarked data. Causing the collected data to be stored may include providing the collected data to a consumer operator which stores the collected data in the one or more data targets.

The method may further include providing a plurality of producer operators, each producer operator being responsible for collecting data in response to a subset of the events. The method may further include providing a plurality of producer operators, each producer operator being responsible for collecting data from a subset of the data sources. Defining one or more rules may include retrieving metadata associated with the one or more data sources.

The method may further include detecting an event by retrieving metadata associated with the one or more data sources and monitoring the state of the one or more data sources based on the parameters specified in the metadata. The method may further include revising the method based on retrieved metadata associated with the one or more data sources.

In general, in another aspect, the invention features a computer system, for use in collecting data from one or more data sources, into which data is continuously stored, and for use in loading the collected data into one or more data targets. The computer system includes one or more nodes, a plurality of CPUs, each of the one or more nodes providing access to the one or more CPUs, a plurality of data storage devices, each of the one or more CPUs providing access to a subset of the plurality of data storage devices, each of the one or more data sources being distributed across the plurality of data storage devices. The computer system includes a plurality of processes, each of the processes being associated with a subset of the nodes, a subset of the CPUs and a subset of the data storage devices. Each of the plurality of processes defines one or more events and defines one or more rules associated with each event. When one of the one or more events occurs, the associated process causes unmarked data to be collected from the portion of the one or more data sources distributed to the nodes, CPUs, and data storage devices associated with the process, the collection being performed in accordance with the rules associated with the one event. The associated process marks the collected, unmarked data in the portion of the one or more data sources distributed to the CPUs and data storage devices associated with the process. The associated process causes the collected data to be stored in one or more of the data targets.

In general, in another aspect, the invention features a computer program, stored on a tangible storage medium, for use in collecting data from one or more data sources, into which data is continuously stored, and loading the collected data into one or more data targets. The program includes executable instructions that cause a computer to define one or more events and define one or more rules associated with each event. When one of the one or more events occurs, the executable instructions cause the computer to cause unmarked data to be collected from the one or more data sources in accordance with the rules associated with the one event, mark the collected, unmarked data in the one or more data sources, and cause the collected data to be stored in one or more of the data targets.

DETAILED DESCRIPTION

A special data access component called a "Scalable Data Connector" augments a traditional data warehouse that supports strategic decision making to produce an active data warehouse that supports short and tactical decision making in real-time.

Figure 1:
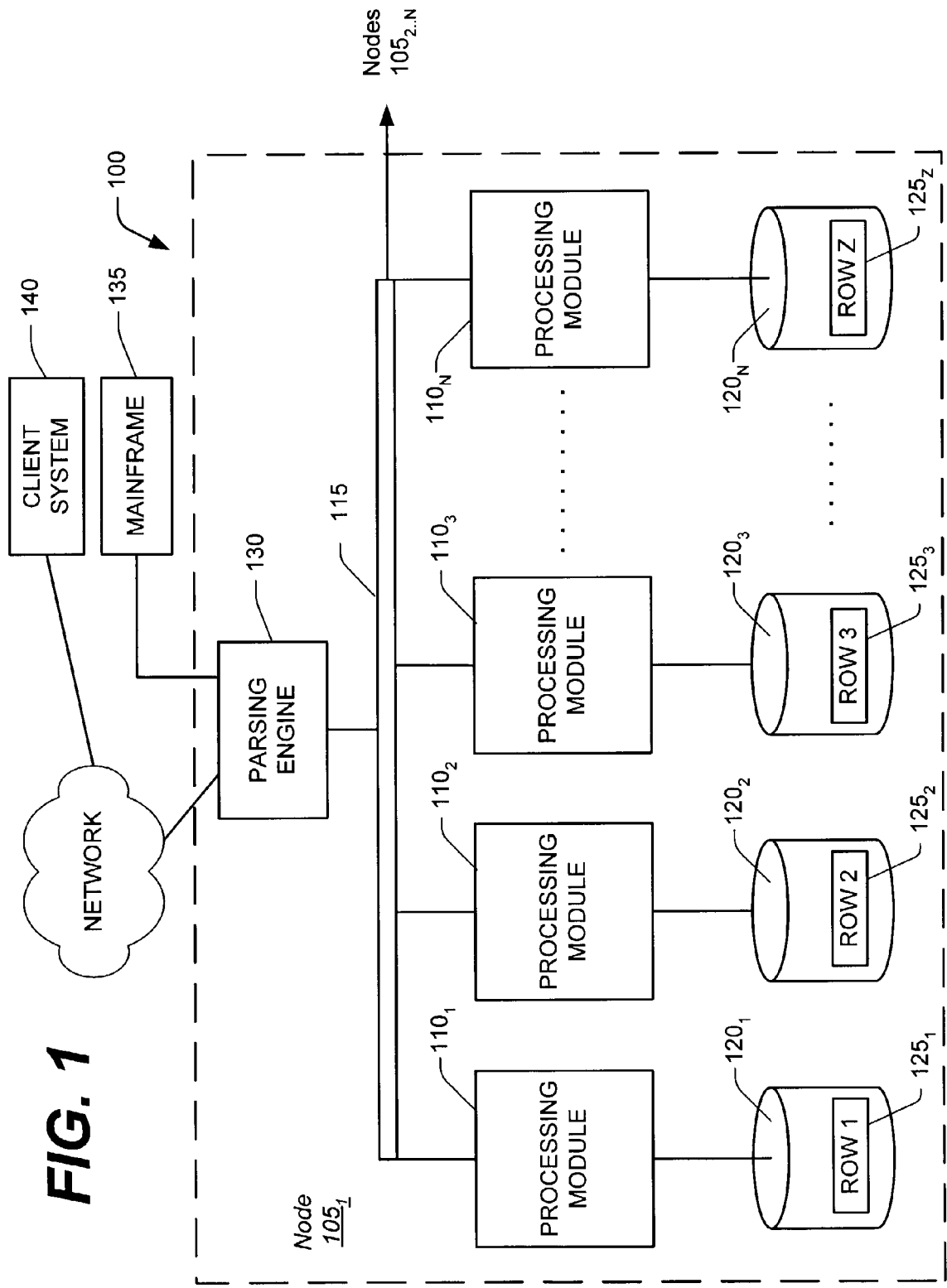
FIG. 1 is a block diagram of a node of a database system.

The event-driven, rule-based, scalable data collecting technique disclosed herein may be used with large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
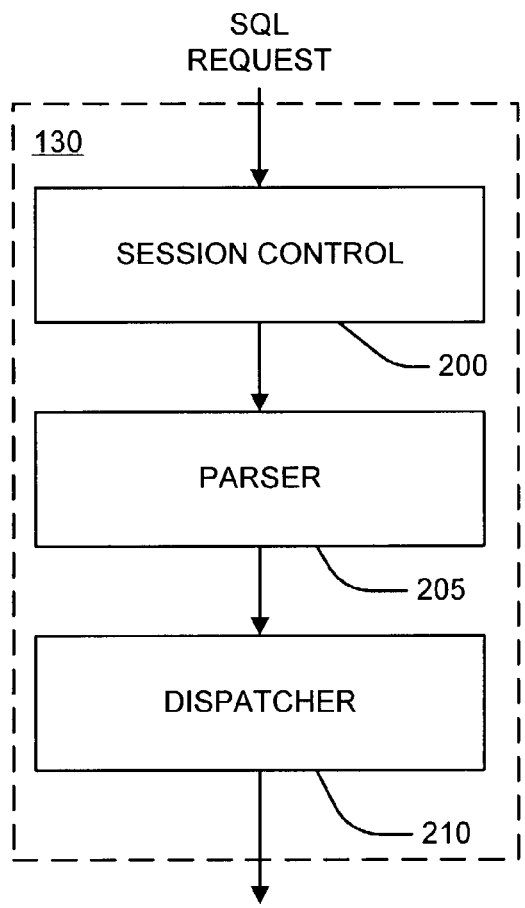
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
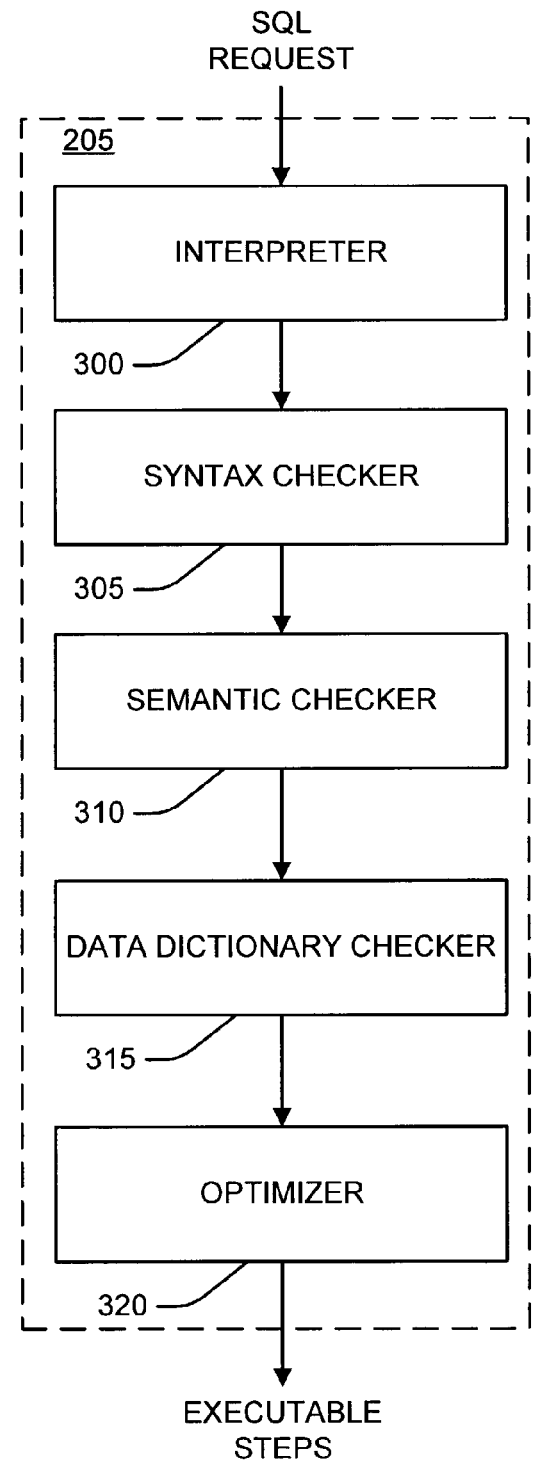
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

The Scalable Data Connector runs as part of the Teradata Warehouse Builder infrastructure, available from NCR Corporation, the assignee of the present invention. Consequently, it inherits the features provided by that infrastructure, including "Multi-Phase Coordination Protocol." For example, multiple instances of Scalable Data Connectors (along with other processes and functions) can be run in parallel, with each performing tasks defined by a task coordinator. One of the Scalable Data Connectors may be a master and the others may be slaves. The task coordinator may proscribe a multi-phase plan for performing a larger task, such as a data load. The Scalable Data Connectors and the other processes and functions may work independently to perform their tasks in phases, with the task coordinator synchronizing the phases as necessary. The Scalable Data Connectors and the other process and functions may execute in a checkpoint-restartable fashion (i.e., capable of re-entering a task from a known point in its execution).

In addition to enhancing performance through parallelism and scalability, the Scalable Data Connector can also integrate users' intelligence such as the logistics, structure, location, sizes, pattern, etc. of the data sources for providing optimal and intelligent access to data in both the active and traditional data warehouses.

Users' intelligence can be defined as rules and is either (a) given directly in the Scalable Data Connector or (b) stored in some central metadata repository. A metadata repository functions like an active middle-ware, layer between users' applications and storage systems. Through programmatic interfaces, applications can query the metadata associated with the desired data sources, i.e. datasets, files, disks, tapes, and so on. The rules specify conditions and corresponding operations, or actions, which need to be performed when these conditions are satisfied. The conditions can include logical predicates that represent such things as value thresholds, time intervals, text patterns, etc. These predicates, in turn, can be combined into logical expressions via operations such as AND, OR, NOT, etc. In order to execute the action specified in the rule, the rule's condition has to evaluate to "true". The entire process during which the rule's condition is evaluated and, if necessary, its action carried out—is referred to as "rule evaluation".

Systems that incorporate rules are called "rule based". In some rule-based systems rule evaluation is initiated, or "triggered" by so-called "events". Events usually represent a state change in a given resource. The resource's state is usually monitored by some component, which is responsible for detecting state changes and notifying other components through events. A state change can be detected, for example, by the creation of a new file, the expiration of a time interval, a given value exceeding a certain limit, a failure of some component, etc. In some cases, a rule's action can result in an event that triggers evaluation of other rules. Systems which utilize events are called "event-based" or "event-driven". Like rules, events can also be defined through metadata and these definitions are stored in a metadata repository to be retrieved later, or alternatively can be given directly to the applicable component, such as the data connector. Event definitions can specify parameters and other characteristics that can be used to set up the monitoring of a given resource, such as a file or another data source.

The Scalable Data Connector is rule-based and event-driven. To provide high-performance and intelligent access to data in a data warehouse, the first step is to determine what processing rules of the applications are useful for achieving a high-performance implementation and increasing data freshness. These processing rules include the interfaces of storage systems in which the source data reside, the internal structures of the source data such as file locations, names of datasets in each file, structures, types, sizes, storage patterns, etc. Typically, the following levels of information can be considered:

Application level—This level of information may contain the time of each run to keep track of the data arrival, data usage, application execution environments, run-time arguments, timing results, etc. This information is important for monitoring the data arrival and optimizing I/O operations for data access.

Program level—This level of information mainly describes the structures of data used in a users' applications, including data types, data structures, file locations, file sizes, single data set distributed across multiple files, etc. This information can provide easy-to-use interfaces for accessing the data.

Performance level—This level of information can be data partition patterns, data set associations, data storage patterns, historical performance factors, etc. This information is used to provide hints for performing data pre-fetching, pre-staging, caching, etc.

All of the above information can be defined as rules and stored as metadata in the data warehouse. At runtime, a data access component, such as the Scalable Data Connector, can obtain this information through runtime parameters and process it in response to "events" which can trigger actions when specific rule conditions are true.

Events can also be detected based on date-time intervals or on demand. For example, users can schedule or control the execution of the Scalable Data Connector such that data can be collected and processed at the right time for the right user.

To gain maximum advantage from every available hardware resource and optimized data access in complex, ad hoc environments, the Scalable Data Connector automatically scales to deliver scalable performance for both traditional and active data warehouses.

To deliver performance across multiple nodes and disks, the Scalable Data Connector can also be extended to scale beyond a single node or a single system. Higher performance is achieved by sharing access to the set of disks within the same node, such as data-storage facilities $120_{1...N}$, or across nodes that make up the file system.

The Scalable Data Connector also provides parallelism. One way of accomplishing parallelism is to divide data into multiple parts and assign a task for each of the data parts. The Scalable Data Connector fits into this processing paradigm by allowing users to launch multiple instances of the Scalable Data Connector, each of which is responsible for a part of the application's workload. For example, a separate instance of the Scalable Data Connector may be launched for each of a set of data sources, e.g., $810_{1...N}$ (discussed below). Each of the instances of the Scalable Data Connector can operate independently in the context of the Multi-Phase Coordination Protocol.

The Scalable Data Connector provides dynamic workload balancing. Through the use of the Multi-Phase Coordination Protocol, the Scalable Data Connector can coordinate its instances such that they can share information resulting in more intelligent access to data. For example, rules provided by the user can be processed by a "master" instance and dispersed to the rest of the "slave" instances at runtime. This information includes real-time performance data, file sizes, workload semantics, queue depths, etc. so that the workload for each of the instances can be balanced at runtime.

The active data warehouse expands the scope of the traditional data warehouse to include tactical decision support that is critical for all operational and service levels within an organization. As a result, 24×7×52 availability becomes almost an absolute requirement. The Scalable Data Connector can survive system and I/O failures and can automatically restart a number of times based on user-defined rules, thus allowing the data warehouse to continuously operate in the event of node, disk connection or file failures.

The Scalable Data Connector also allows simultaneous extraction from multiple disparate data sources such as files, tapes, named pipes, data queues, relational and non-relational data sources within a single job or application.

The concurrent fetches also allow hiding of the latency of accessing data by enabling one or more pieces of data to be accessed concurrently with processing of other pieces.

The Scalable Data Connector can be deployed in both the traditional and active data warehousing environments. The scalability feature in the Scalable Data Connector allows data collection to scale beyond single-node and single-system performance limits The addition of rule-based and event processing extends the Scalable Data Connector to utilize data semantics and users' intelligence to process data in a more intelligent manner.

The typical applications that can use the Scalable Data Connector as a data collection component include:

Data Collection on Demand

This data collection technique is the most commonly used in both the traditional and active data warehousing environments. Within the application, the Scalable Data Connector can be scheduled to run at any time during a day or upon user-submission of the application. The Scalable Data Connector can run continuously with automatic restart until the data source is exhausted, at which time the application would terminate.

Data Collection Based on User-defined Time Intervals

This data collection technique requires the user to provide information about the date and time the Scalable Data Connector would start (or end) running. Within this date-time duration, a time interval can be used to initiate periodic data collection using the specified interval value. This type of collection would allow users to provide periodic updates to the active data warehouse in a continuous manner. Users can also optimally devise a scheme of data collection such that system resources can be used in an intelligent way, while still delivering information in a timely and quality manner. The Scalable Data Connector can run continuously with automatic restart until the ending date-time is reached, at which time the application would terminate.

Data Collection Based on Data Arrival

This data collection technique extends the previous interval-based data collection to include monitoring data arrival. This technique can be augmented to process data based on more user-defined criteria such as the date-time of data arrival, the file name pattern, some threshold limits to trigger files collection, and so on. Users can also allow the application to run until explicit cancellation of the application. Users can also optimally devise a scheme of data collection such that system resources can be used in an intelligent way while still delivering information in a timely and quality manner. The Scalable Data Connector can run continuously with automatic restart until the ending date-time is reached or explicit cancellation of the application.

Alternatively, the Data Connector can monitor certain continuous data sources, such as message queues, the so-called "pipes", etc., to detect the arrival of a new message or data element from these sources, and then proceed to apply collection rules to the data.

Data Collection Based on Transactional Semantics

This data collection technique is used to monitor transactional boundaries of data and process them in real-time. This technique can be augmented to process data based on more user-defined criteria such as the date-time interval, data arrival, the file name pattern, and so on. This type of collection can allow users to provide updates to the active data warehouse based on transactional data so that data targets are always maintained with high data consistency and maximum data currency. The Scalable Data Connector can run continuously with automatic restart until the ending date-time is reached or explicit cancellation of the application.

Figure 4:
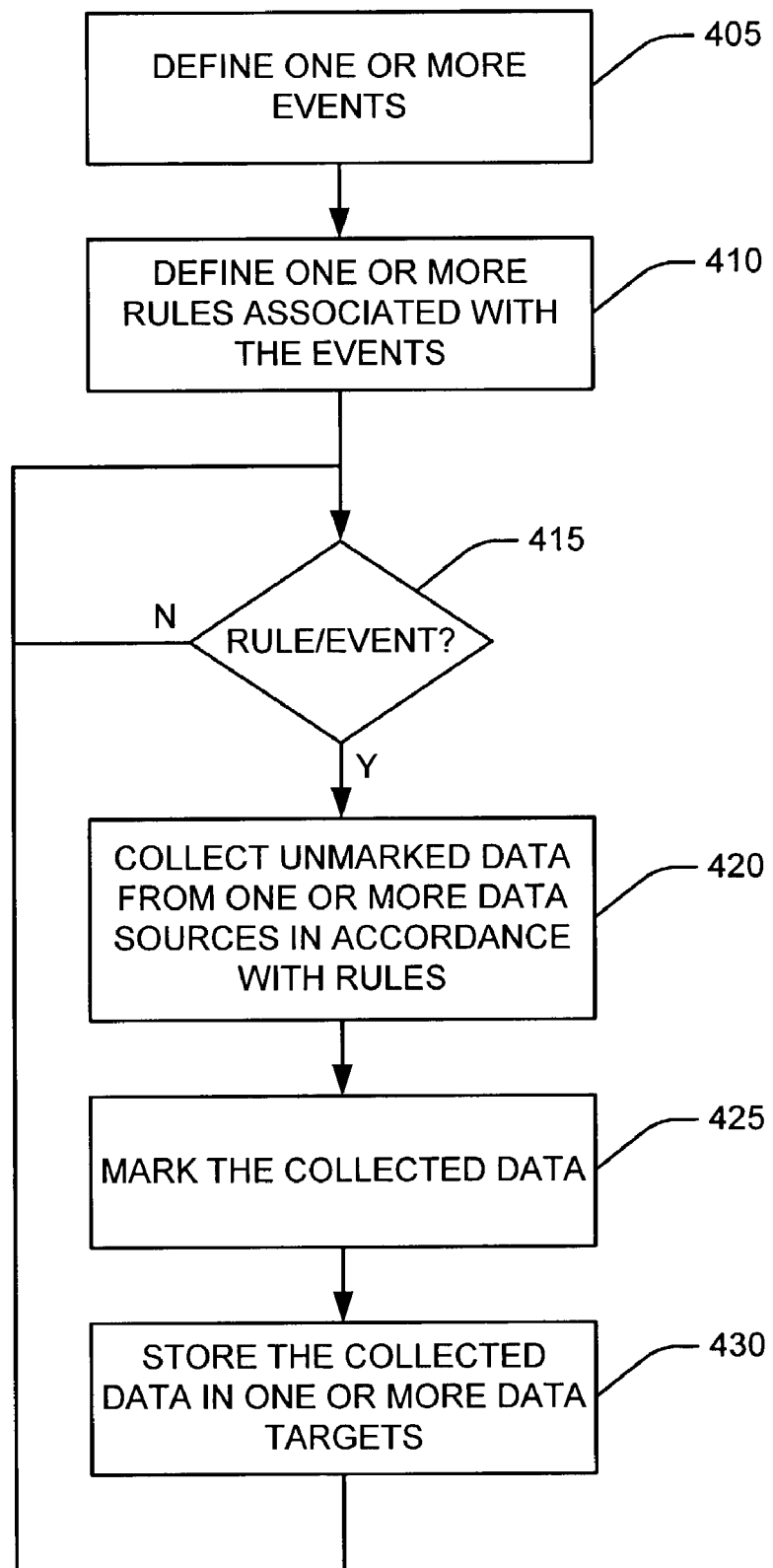
FIG. 4 is a flow chart for a Scalable Data Connector.

In operation, as shown in FIG. 4, the system using the data collection technique defines one or more events (block 405), as described above. The system then defines one or more rules associated with the events (block 410).

If one of the defined events occurs and the rules corresponding to the event are satisfied (block 415), the system collects unmarked data from one or more data sources in accordance with the rules (block 420). The system marks the collected data to allow the system to know that the data has already been collected (block 425) by setting a flag or using another conventional technique. The system then stores the collected data in one or more data targets (block 430).

Figure 5:
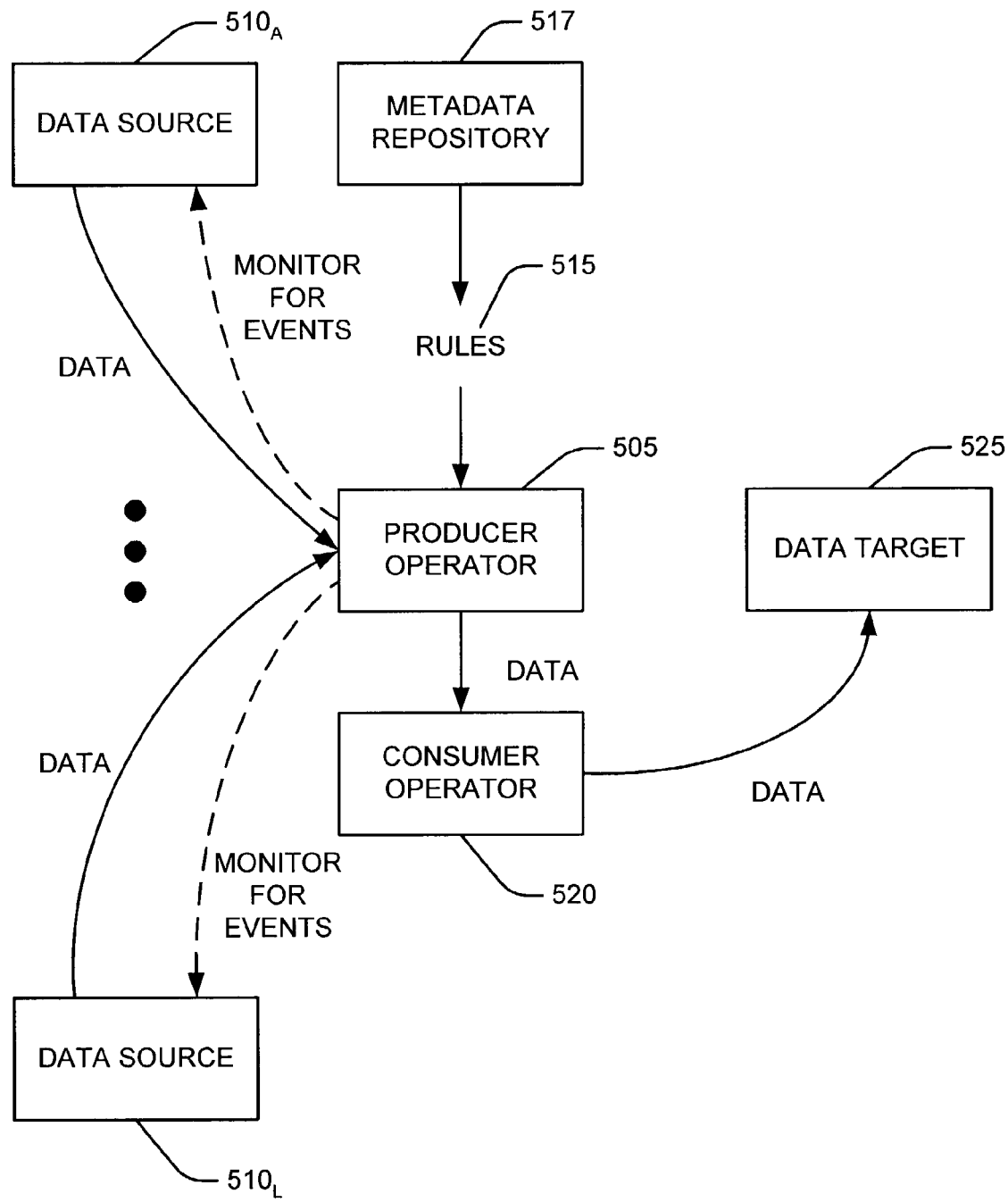
FIGS. 5-9 are block diagrams of systems capable of performing event-driven, rule-based, scalable data collection.

A system for performing the data collection technique, illustrated in FIG. 5, includes a producer operator 505 that accepts rules 515 from a user or metadata repository 517. The producer operator 505 monitors one or more data sources $510_A \ldots 510_L$ for events. When a recognized event occurs, the producer operator 505 collects unmarked data from one or more of the data sources $510_A \ldots 510_L$ in accordance with the rules 515. The producer operator 505 provides the collected data to a consumer operator 520 which stores the collected data in a data target 525. The producer operator 505 marks the collected data in the one or more data sources $510_A \ldots 510_L$ so that it will not collect the data again.

Figure 6:
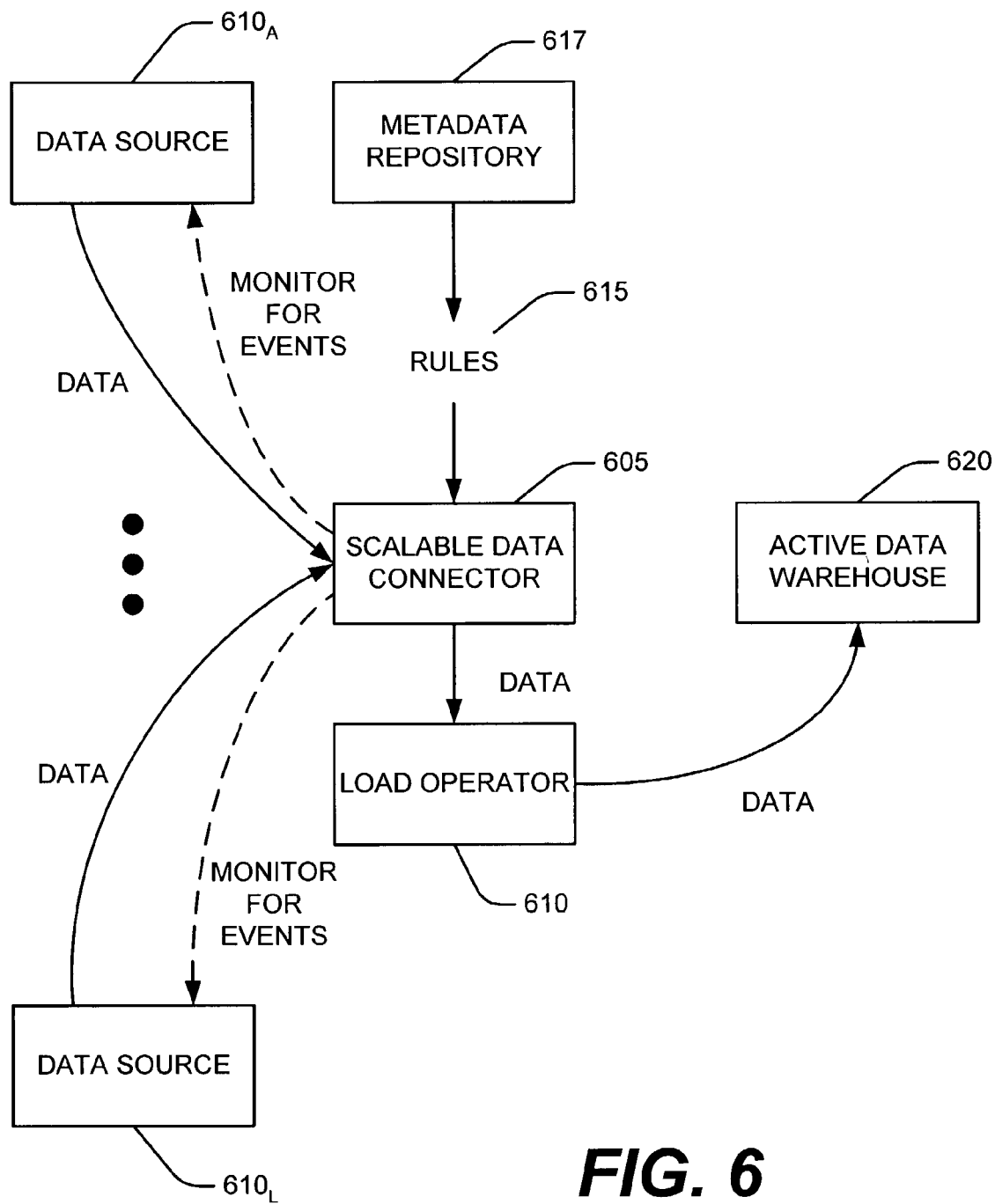

In a more specific application for loading data into an active data warehouse, shown in FIG. 6, the producer operator is a Scalable Data Connector 605, the consumer operator is a load operator 610, and the data target is an active data warehouse 615, such as the DBS illustrated in FIG. 1. The Scalable Data Connector 605 monitors one or more data sources $610_A \ldots 610_L$ for events. When a recognized event occurs, the Scalable Data Connector 605 collects unmarked data from one or more of the data sources $610_A \ldots 610_L$ in accordance with a set of rules 615 (which may be derived from metadata 617). The Scalable Data Connector 605 provides the collected data to the load operator 610 which stores the collected data in the active data warehouse 620. The Scalable Data Connector 605 marks the collected data in the one or more data sources $610_A \ldots 610_L$ so that it will not collect the data again.

Figure 7:
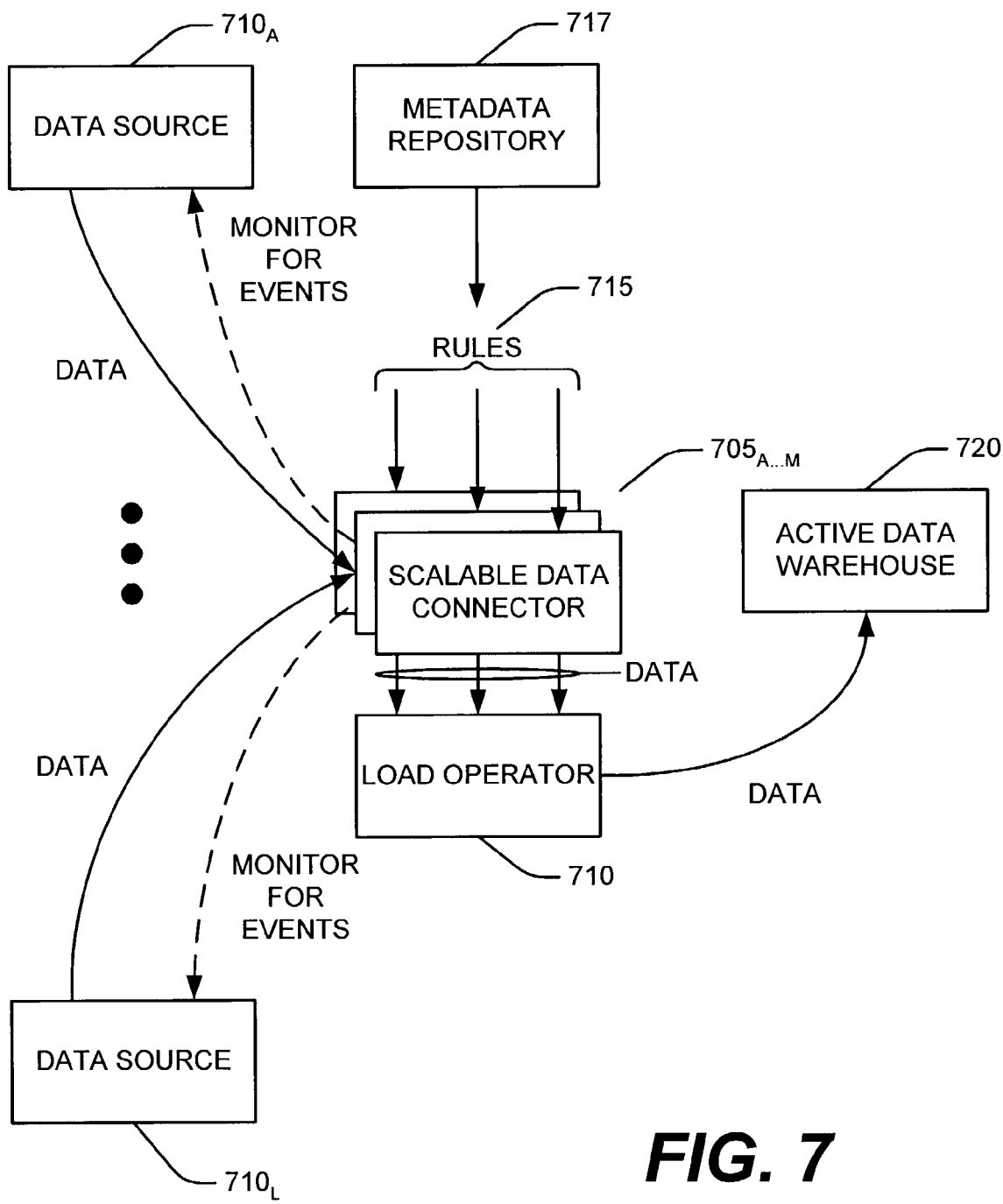

In another application for loading data into an active data warehouse, shown in FIG. 7, which illustrates the scalability of the Scalable Data Connector, a plurality of Scalable Data Connectors $705_A \ldots 705_M$ monitor one or more data sources $710_A \ldots 710_L$ for events, with each of the Scalable Data Connectors monitoring a subset of the data sources. When a recognized event occurs, the Scalable Data Connector monitoring for that event collects unmarked data from one or more of the associated data sources in accordance with a subset of a set of rules 715 (which may be derived from metadata 717) defined for the plurality of Scalable Data Connectors $705_A \ldots 705_M$. The Scalable Data Connector provides the collected data to the load operator 710 which stores the collected data in the active data warehouse 720. The Scalable Data Connector marks the collected data in the one or more data sources $710_A \ldots 710_L$ so that it will not collect the data again.

Figure 8:
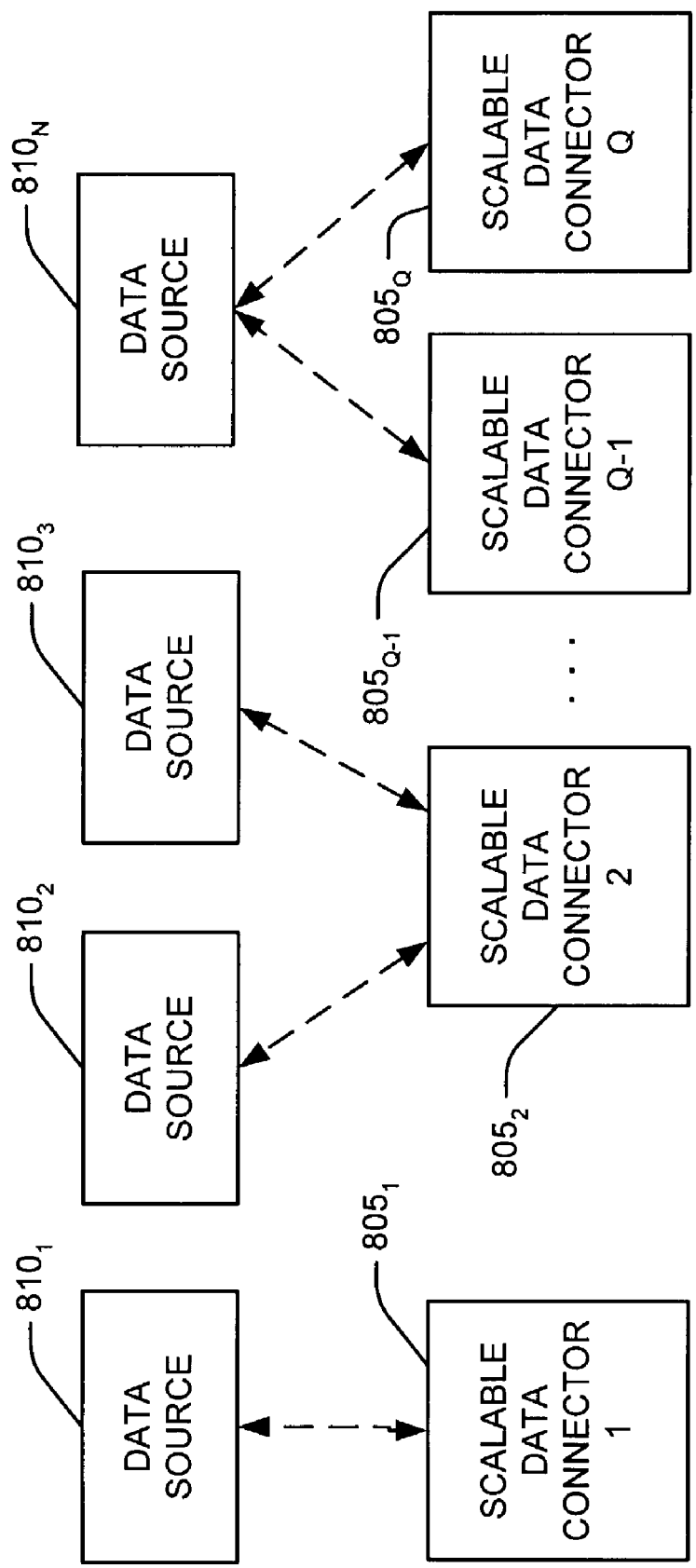

The ability of Scalable Data Connectors to work in parallel and to dynamically balance workload, illustrated in FIG. 8, derives from the fact that multiple instances of the Scalable Data Connector can execute simultaneously. In FIG. 8, a first instance of the Scalable Data Connector $805_1$ monitors events related to data source $810_1$. A second instance of the Scalable Data Connector $805_2$ and monitors events related to data sources $810_2$ and $810_3$. A Q-1st instance and a Qth instance of the Scalable Data Connector $805_{Q-1}$ and $805_Q$ monitor events related to the data stored in data source $810_N$. In this arrangement, the processing load associated with data source $810_N$ requires two Scalable Data Connectors $805_{Q-1}$ and $805_Q$. The processing load associated with data source $810_1$ requires a single Scalable Data Connector $805_1$. The processing load associated with two data sources $810_2$ and $810_3$ can be managed by a single Scalable Data Connector $805_2$.

This arrangement is flexible and can be changed as the processing load associated with each of the data storage facilities changes. For example, if the processing load associated with data source $810_N$ decreases, one of the two Scalable Data Connectors $805_{Q-1}$ and $805_Q$ can be released and either terminated or assigned to monitor events related to another data source. Similarly, if the processing load associated with data source $810_2$ and $810_3$ increases, a second Scalable Data Connector may be assigned to assist Scalable Data Connector $805_2$.

The Scalable Data Connectors can also operate across node boundaries. Consequently, a single Scalable Data Connector can operate across more than one of the nodes $105_{1 \ldots N}$ illustrated in FIG. 1.

Figure 9:
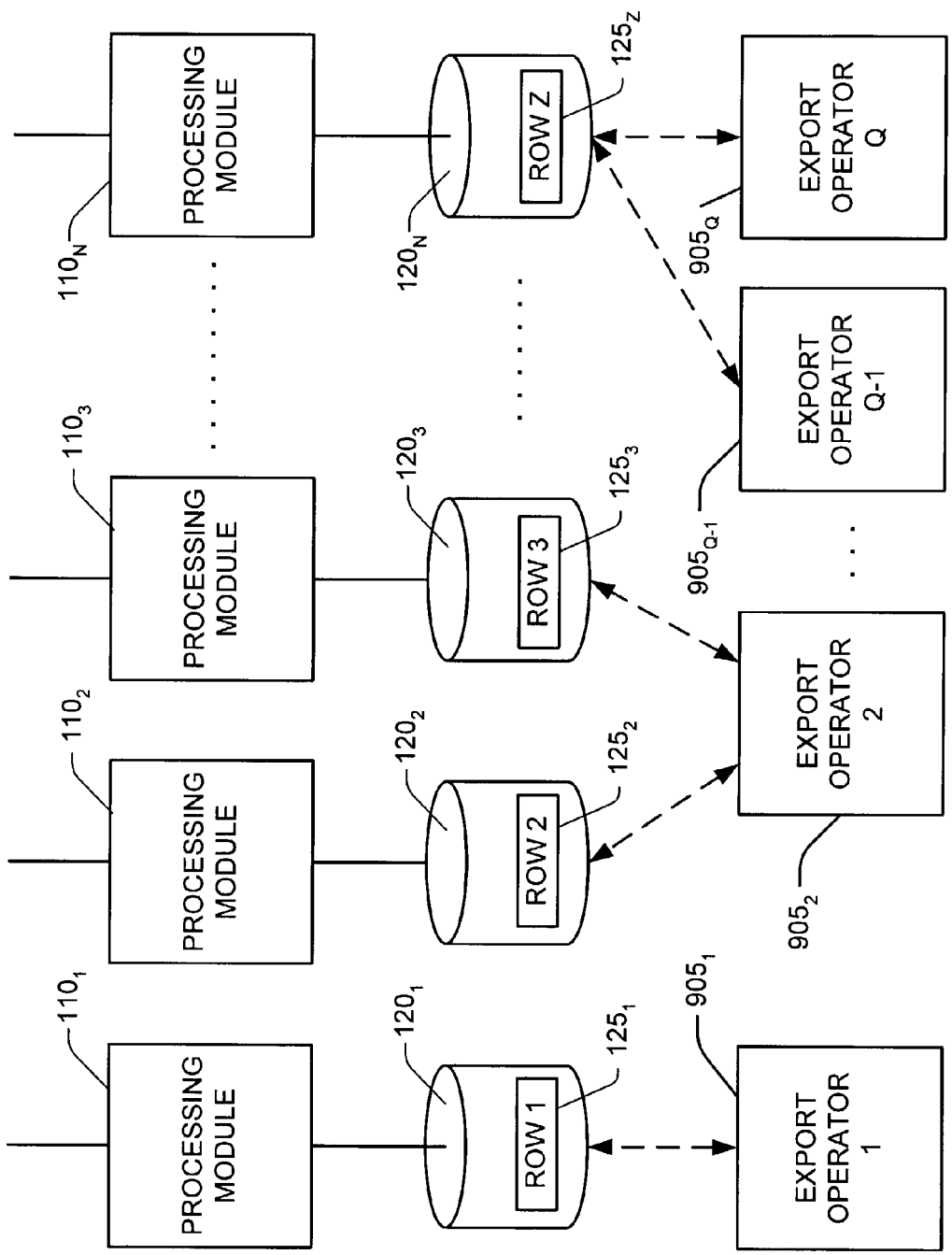

Another producer operator, known as an "Export" operator, illustrated in FIG. 9, retrieves data spread across multiple nodes $105_{1 \ldots N}$ in a scalable manner, applying many of the event and rule processing techniques described above for the Scalable Data Collector. Just as with the Scalable Data Collector, the Export operator monitors events associated with data sources, such as, for example, one or more of the data storage facilities $120_{1 \ldots N}$ illustrated in FIG. 1. When an event occurs, the monitoring Export operator exports data from the data storage facility or facilities it is monitoring in accordance with a set of rules. As with the Scalable Data Collector, the rules may derive from metadata associated with the data storage facility or facilities the Export operator is monitoring.

Like the Scalable Data Collector, the Export operator is scalable and has the ability to dynamically balance the workload. In FIG. 9, for example, a first instance of the Export operator $905_1$ executes on processing module $110_1$ and monitors events related to the data stored in data storage facility $120_1$. A second instance of the Export operator $905_2$ executes on two processing modules $110_2$ and $110_3$ and monitors events related to the data stored in data storage facilities $120_2$ and $120_3$. A Q-1st instance and a Qth instance of the Export operator $905_{Q-1}$ and $905_Q$ execute on a single processing module $110_N$ and monitor events related to the data stored in data storage facility $120_N$.

Just as with the Scalable Data Connector, this arrangement is flexible and can be changed as the processing load associated with each of the data storage facilities changes. For example, if the processing load associated with data storage facility $120_N$ decreases, one of the two Export operators $905_{Q-1}$ and $905_Q$ can be released and either terminated or assigned to monitor events related to another data storage facility. Similarly, if the processing load associated with data storage facilities $120_2$ and $120_3$ increases, a second Export operator may be assigned to assist Export operator $905_2$.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for collecting data from one or more data sources, into which data is continuously stored, and for loading the collected data into one or more data targets, the method including:
   defining one or more events;
   defining one or more rules associated with each event;
   when one of the one or more events occurs,
      causing unmarked data to be collected from the one or more data sources in accordance with the rules associated with the one event;
      marking the collected, unmarked data in the one or more data sources to indicate that it has been collected; and
      causing the collected data to be stored in one or more of the data targets.

2. The method of claim 1 where defining one or more events includes:
   predefining as events specific changes in the state of a given data source.

3. The method of claim 1 where defining one or more rules includes:
   identifying one or more ranges of one or more parameters associated with the events generated for one or more data sources, such that if the one or more parameters associated with the data in the one or more data sources fall within the one or more ranges, a condition of a rule is satisfied; and
   predefining specific courses of action to follow when the condition of the rule is satisfied.

4. The method of claim 3 where identifying parameters includes:
   identifying information at one or more of the following levels: the application level, the program level, and the performance level.

5. The method of claim 1 where causing unmarked data to be collected includes:
   identifying, according to the rules associated with the one event, the data to be collected; and
   collecting the unmarked data from the identified data to be collected.

6. The method of claim 1 where marking the collected, unmarked data includes:
   setting a flag associated with the collected, unmarked data.

7. The method of claim 1 where causing the collected data to be stored includes:
   providing the collected data to a consumer operator which stores the collected data in the one or more data targets.

8. The method of claim 1 further including:
   providing a plurality of producer operators, each producer operator being responsible for collecting data in response to a subset of the events.

9. The method of claim 1 further including:
   providing a plurality of producer operators, each producer operator being responsible for collecting data from a subset of the data sources.

10. The method of claim 1 where defining one or more rules includes:
    retrieving metadata associated with the one or more data sources.

11. The method of claim 1 further including:
    detecting an event by retrieving metadata associated with the one or more data sources and monitoring the state of the one or more data sources based on the parameters specified in the metadata.

12. The method of claim 1 further including:
    revising the method based on retrieved metadata associated with the one or more data sources.

13. A computer system, for use in collecting data from one or more data sources, into which data is continuously stored, and for use in loading the collected data into one or more data targets, the computer system including:
    one or more nodes;
    a plurality of CPUs, each of the one or more nodes providing access to the one or more CPUs;
    a plurality of data storage devices, each of the one or more CPUs providing access to a subset of the plurality of data storage devices;
    each of the one or more data sources being distributed across the plurality of data storage devices;

a plurality of processes, each of the processes being associated with a subset of the nodes, a subset of the CPUs and a subset of the data storage devices, each of the plurality of processes:
  defining one or more events;
  defining one or more rules associated with each event;
  when one of the one or more events occurs,
    causing unmarked data to be collected from the portion of the one or more data sources distributed to the nodes, CPUs, and data storage devices associated with the process, the collection being performed in accordance with the rules associated with the one event; and
    marking the collected, unmarked data in the portion of the one or more data sources distributed to the CPUs and data storage devices associated with the process to indicate that it has been collected;
      causing the collected data to be stored in one or more of the data targets.

14. The computer system of claim 13 further including
  each of the one or more data targets being distributed across the plurality of data storage devices; and where
  causing the collected data to be stored in one or more of the data targets includes:
    causing the collected data to be stored in the portion of the one or more data targets associated with the process.

15. The computer system of claim 13 where defining one or more events includes:
  predefining as events specific changes in the state of a given data source.

16. The computer system of claim 13 where defining one or more rules includes:
  identifying one or more ranges of one or more parameters associated with the events generated for one or more data sources, such that if the one or more parameters associated with the data in the one or more data sources fall within the one or more ranges, a condition of a rule is satisfied; and
  predefining specific courses of action to follow when the condition of the rule is satisfied.

17. The computer system of claim 16 where identifying parameters includes:
  identifying information at one or more of the following levels: the application level, the program level, and the performance level.

18. The computer system of claim 13 where causing unmarked data to be collected includes:
  identifying, according to the rules associated with the one event, the data to be collected; and
  collecting the unmarked data from the identified data to be collected.

19. The computer system of claim 13 where marking the collected, unmarked data includes:
  setting a flag associated with the collected, unmarked data.

20. The computer system of claim 13 where causing the collected data to be stored includes:
  providing the collected data to a consumer operator which stores the collected data in the one or more data targets.

21. The computer system of claim 13 further including:
  providing a plurality of producer operators, each producer operator being responsible for collecting data in response to a subset of the events.

22. The computer system of claim 13 further including:
  providing a plurality of producer operators, each producer operator being responsible for collecting data from a subset of the data sources.

23. The computer system of claim 13 where defining one or more rules associated with each event includes:
  retrieving metadata associated with the one or more data sources.

24. The computer system of claim 13 where each of the plurality of processes further includes:
  detecting an event by retrieving metadata associated with the one or more data sources and monitoring the state of the one or more data sources based on the parameters specified in the metadata.

25. The computer system of claim 13 where each of the plurality of processes further includes:
  revising the computer system based on retrieved metadata associated with the one or more data sources.

26. A computer program, stored on a tangible storage medium, for use in collecting data from one or more data sources, into which data is continuously stored, and loading the collected data into one or more data targets, the program including executable instructions that cause a computer to:
  define one or more events;
  define one or more rules associated with each event;
  when one of the one or more events occurs,
    cause unmarked data to be collected from the one or more data sources in accordance with the rules associated with the one event;
    mark the collected, unmarked data in the one or more data sources to indicate that it has been collected; and
    cause the collected data to be stored in one or more of the data targets.

27. The computer program of claim 26 where, when defining one or more events, the computer:
  predefines as events specific changes in the state of a given data source.

28. The computer program of claim 26 where, when defining one or more events, the computer:
  identifies one or more ranges of one or more parameters associated with the events generated for one or more data sources, such that if the one or more parameters associated with the data in the one or more data sources fall within the one or more ranges, a condition of a rule is satisfied; and
  predefines specific courses of action to follow when the condition of the rule is satisfied.

29. The computer program of claim 28 where, when identifying parameters, the computer:
  identifies information at one or more of the following levels: the application level, the program level, and the performance level.

30. The computer program of claim 26 where, when causing unmarked data to be collected, the computer:
  identifies, according to the rules associated with the one event, the data to be collected; and
  collects the unmarked data from the identified data to be collected.

31. The computer program of claim 26 where, when marking the collected, unmarked data, the computer:
  sets a flag associated with the collected, unmarked data.

32. The computer program of claim 26 where, when causing the collected data to be stored, the computer:
  provides the collected data to a consumer operator which stores the collected data in the one or more data targets.

33. The computer program of claim 26 further including executable instructions that cause the computer to:
  provide a plurality of producer operators, each producer operator being responsible for collecting data in response to a subset of the events.

34. The computer program of claim 26 further including executable instructions that cause the computer to:

provide a plurality of producer operators, each producer operator being responsible for collecting data from a subset of the data sources.

35. The computer program of claim 26 where, when defining one or more rules, the computer:

retrieves metadata associated with the one or more data sources.

36. The computer program of claim 26 further including executable instructions that cause the computer to:

detect an event by retrieving metadata associated with the one or more data sources.

37. The computer program of claim 26 further including executable instructions that cause the computer to:

revise the computer program based on retrieved metadata associated with the one or more data sources.

* * * * *